United States Patent [19]

Sakai

[11] Patent Number: 4,686,706

[45] Date of Patent: Aug. 11, 1987

[54] DIGITAL SIGNAL RECEIVER

[75] Inventor: Mutsuo Sakai, Matsubara, Japan

[73] Assignee: Sanyo Electric Co., Ltd., Morigushi, Japan

[21] Appl. No.: 865,954

[22] Filed: May 19, 1986

Related U.S. Application Data

[63] Continuation of Ser. No. 515,115, Jul. 19, 1983, abandoned.

[30] Foreign Application Priority Data

Jul. 19, 1982 [JP] Japan ................................ 57-126461

[51] Int. Cl.⁴ ........................ H04B 11/16; H04B 1/16
[52] U.S. Cl. .................................. 455/186; 455/200; 455/340
[58] Field of Search ............... 455/185, 186, 197, 200, 455/340, 311, 161; 371/47; 358/147

[56] References Cited

U.S. PATENT DOCUMENTS

| | | | |
|---|---|---|---|
| 4,041,402 | 8/1977 | Mogi | 455/186 |
| 4,220,922 | 9/1980 | Ikeguchi | 455/186 |
| 4,247,952 | 1/1981 | Shibuya | 455/186 |
| 4,253,194 | 2/1981 | Van Deursen | 455/185 |
| 4,357,712 | 11/1982 | Kawakami | 455/161 |

OTHER PUBLICATIONS

Hall, "The 'Superalphadyne' Portable Receiver", May 1976, all.

Primary Examiner—Robert L. Griffin
Assistant Examiner—Curtis Kuntz
Attorney, Agent, or Firm—Armstrong, Nikaido, Marmelstein & Kubovcik

[57] ABSTRACT

A digital signal receiver comprises a plurality of frequency characteristic correcting circuits (14, 15, 16) for correcting a group delay characteristic which is different for each of the respective broadcasting stations and a location for reception thereof. A station selecting integrated circuit (18) provides a switching signal corresponding to a selected station position to render non-conductive any of transistors (Q1, Q2, Q3) for selecting the respective frequency characteristic correcting circuits through switches (SW1 to SW8) for determining which of the plurality of frequency characteristic correcting circuits is to be selected. The corresponding frequency characteristic correcting circuit is enabled in response to non-conduction of any one of the transistors for connection to the output from an intermediate frequency circuit (2) including a detecting circuit for demodulating the digital signal. As a result, the group delay characteristic which is different for each of the broadcasting stations and a location for reception thereof can be corrected each time an electric wave from each of the broadcasting stations is selected by means of the tuner.

3 Claims, 10 Drawing Figures

DIGITAL SIGNAL RECEIVER

This application is a continuation of application Ser. No. 515,115 filed 7/19/83 now abandoned.

BACKGROUND OF THE INVENTION

1. Field of the Invention

The present invention relates to a digital signal receiver. More specifcally, the present invention relates to a digital signal receiver such as a teletext receiver adapted for displaying characters on a screen by extracting a digital signal including a clock run-in signal, a framing code signal and a data signal inserted in the vertical blanking period of a television signal of character multiplex transmission.

2. Description of the Prior Art

Character multiplex broadcasting has been proposed as a digital signal transmission system for use with television receivers. Such system is adapted such that a digital signal representing data such as characters and figures is inserted in an appropriate period of one to several horizontal scanning periods during a vertical blanking period of a television broadcasting signal so that the digital signal may be transmitted.

A receiver adapted for receiving such television character multiplex broadcasting is described in detail in an article entitled "Teletext Receiver and Test Signal Generating Apparatus" contributed by Mr. Kuroda et al. in Sanyo Technical Review, Vol. 11, No. 1, 1979. The above referenced article describes the rating of such teletext signal and an outline of a receiver. Another article entitled "Consumer Text Display Systems" contributed by Brian Harden in IEEE Transactions on Consumer Electronics, July, 1979, Vol. CE 25 also describes an overall structure of a teletext system.

Figure 1:
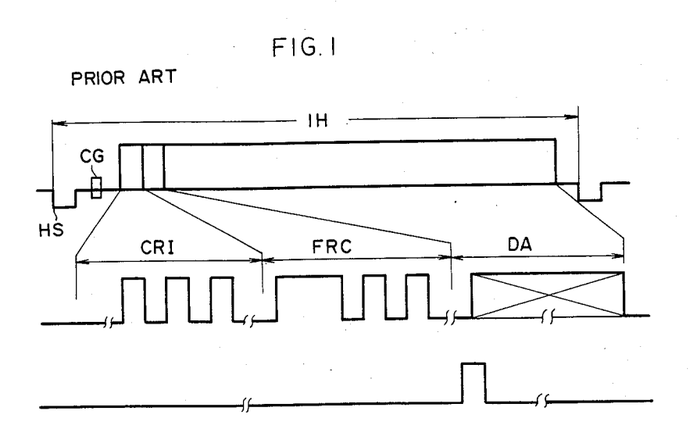
FIG. 1 is a view showing a structure of a television character multiplex signal.

FIG. 1 is a view showing a structure of a television character multiplex signal, representing one horizontal scanning period of the 18th or 19th horizontal scanning period during the vertical blanking period where a digital character signal (data) is inserted. More specifically, a digital signal is inserted in one horizontal scanning period of the 18th or 19th period during the vertical blanking period. The digital signal includes a clock run-in signal, a framing code signal and a data signal. The clock run-in signal starts a predetermined time period after a color burst signal (CG) positioned at the back porch of a horizontal synchronizing signal (HS) and includes a repetition of the logics one and zero. The framing code signal includes an 8-bit signal following the clock run-in signal and the data signal lasts from the next bit of the framing code signal to the end of the above described one horizontal scanning period.

The above described data signal (DA) includes a bit serial code signal covering 8-bits as one word. The above described clock run-in signal is structured as a signal of 16 or 18 bits including a repetition of the logics one and zero as described previously and is used as a time reference in generating a sampling clock signal for extracting the above described data signal (DA) in a television receiver. The above described framing code signal comprises a specified code signal of 8-bits selected to achieve proper synchronization even upon occurrence of a data error of one bit and is used as a time reference in conversion from serial to parallel on an 8-bit by 8-bit basis of the data signal extracted through sampling. Since the framing code signal includes a number of utilizable code structure any suitable one may be employed. For example, the C55 system of NHK in Japan adopts "11100101" and the Teletext system in United Kingdom "11100100" and the Antiope system in France adopts "11100111".

Figure 2:
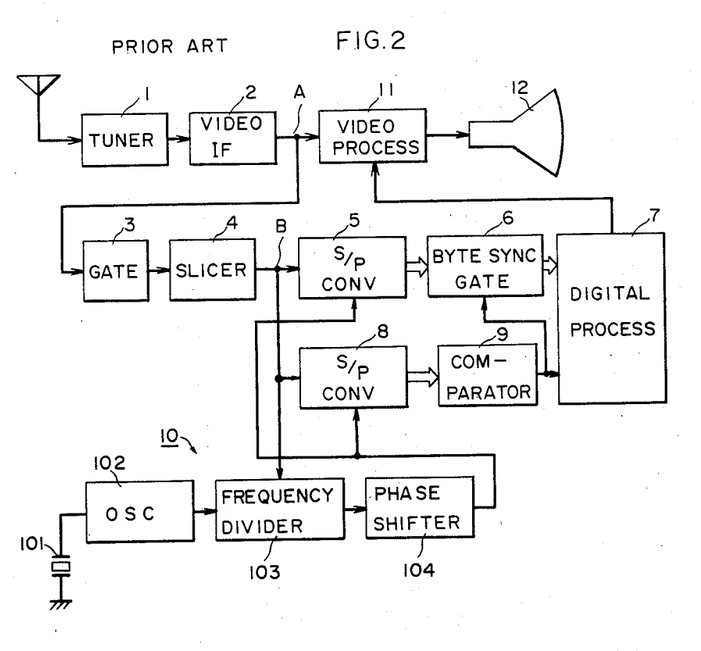
FIG. 2 is a block diagram showing a conventional digital signal receiver for receiving a character multiplex broadcasting signal.

FIG. 2 is a block diagram showing of a conventional digital signal receiver for receiving a character multiplex broadcasting signal and FIGS. 3(a)-3(c) are graphs showing overall group delay characteristic of a transmission path between a transmitter and a receiver.

Now referring to FIG. 2, a structure and an operation of a conventional digital signal receiver will be described. A television signal transmitted from a transmitter end, not shown, is applied through an antenna to a tuner 1. The tuner 1 is selectively tuned to a desired television signal and the desired television signal is converted into a video intermediate frequency signal. The video intermediate frequency signal from the tuner 1 is applied to a video intermediate frequency circuit 2. Although not shown, the video intermediate frequency circuit 2 comprises a video amplifier, a video detecting circuit and the like and provides a video signal. The video signal from the video intermediate frequency circuit 2 is applied to a video processing circuit 11 and a gate circuit 3. The gate circuit 3 serves to extract from the video signal one horizontal scanning period portion of the character multiplex signal as inserted. The output signal from the gate circuit 3 is applied to a slicer circuit 4. The slicer circuit 4 serves to slice the output signal from the gate circuit, thereby to convert the same into a rectangular waveform for the purpose of providing a binary signal. The output signal from the slicer circuit 4 is applied to serial/parallel converting circuits 5 and 8 and a frequency dividing circuit 103 included in a sampling clock generating circuit 10. The sampling clock generating circuit 10 serves to generate a sampling clock signal in synchronism with a clock run-in signal included in the output signal from the slicer circuit 4 and comprises a quartz oscillator 101, an oscillating circuit 102, a frequency dividing circuit 103 and a phase shifting circuit 104. The oscillating circuit 102 is for making oscillation of a signal of say 28 MHz and the frequency dividing circuit 103 serves to frequency divide by 1/5 the oscillation output signal from the oscillating circuit 102 in synchronism with the output signal from the slicer circuit 4. The frequency divided output signal from the frequency dividing circuit 103 is applied to the phase shifting circuit 104 as a sampling clock signal. The phase shifting circuit 104 is provided for adjusting the phase of the sampling clock signal. The sampling clock signal thus generated is applied to the above described serial/parallel converting circuits 5 and 8.

The serial/parallel converting circuit 8 serves to convert the framing code signal of 8 bits into a parallel signal, which is then applied to a comparator 9. The comparator 9 determines coincidence of the preset code signal obtained from a memory stored with the framing code signal obtained from the serial/parallel converting circuit 8, thereby to provide a timing pulse upon coincidence of both, which is applied to a byte synchronization gate circuit 6 and a digital processing circuit 7.

The above described serial/parallel converting circuit 5 includes a shift register and is responsive to the sampling clock signal from the above described sampling clock generating circuit 10 to extract the data signal on an 8-bit by 8-bit basis from the output signal of the slicer circuit 4 by sampling the same, whereby the data signal of 8 bits, i.e. one byte as extracted is converted into a parallel signal. The data signal as converted into the parallel signal by the serial/parallel converting circuit 5 is byte synchronized for every 8 bits by the byte synchronizing gate circuit 6 as a function of the timing pulse obtained from the comparator 9. The data signal as byte synchronized is applied to the digital processing circuit 7. The digital processing circuit 7 comprises a microcomputer, for example, and digitally processes the data signal of 8 bits (one byte) so that the same is displayed on a proper position on the television screen. The digital processing circuit 7 is more fully described in the previously described two articles. The data signal as processed by the digital processing circuit 7 is applied to the video processing circuit 11. The video processing circuit 11 serves to superimpose the data serving as a character signal as processed by the digital processing circuit 7 on to the television video signal obtained from the video intermediate frequency circuit 2 and provides the same to a picture tube 12.

A conventional digital signal receiver is generally structured as described above. A point to be noted in connection with the present invention is an overall group delay characteristic of a transmission path from a modulator on the part of a transmitting station through the tuner 1 to the output point A of the video intermediate frequency circuit 2 in the receiver. More specifically, generally a television receiver is adapted such that the group delay characteristic from the tuner 1 through the video intermediate frequency circuit 2 may be offset by the group delay characteristic on the part of the transmitter. However, this is true only with respect to a high range component (3 to 4 MHz band) in the video signal range and no particular consideration has not been necessarily given to the low frequency range portion (0 to 2 MHz band) in the video signal range. Accordingly, the low frequency range portion of the group delay characteristic at the point A in FIG. 2, i.e. the overall group delay characteristic of the transmission path including the transmitter and the receiver (the low frequency range group delay characteristic) could be flat as shown as (A) in FIG. 3, could be slanted as shown as (B) in FIG. 3 meaning a lagged phase, or could be slanted as shown as (C) in FIG. 3 meaning an advanced phase, depending on the cases. This is determined by the respective group delay characteristics of the transmission path from the modulator on the part of the transmitter through the tuner 1 and the video intermediate frequency circuit 2 in the receiver.

Figure 3:
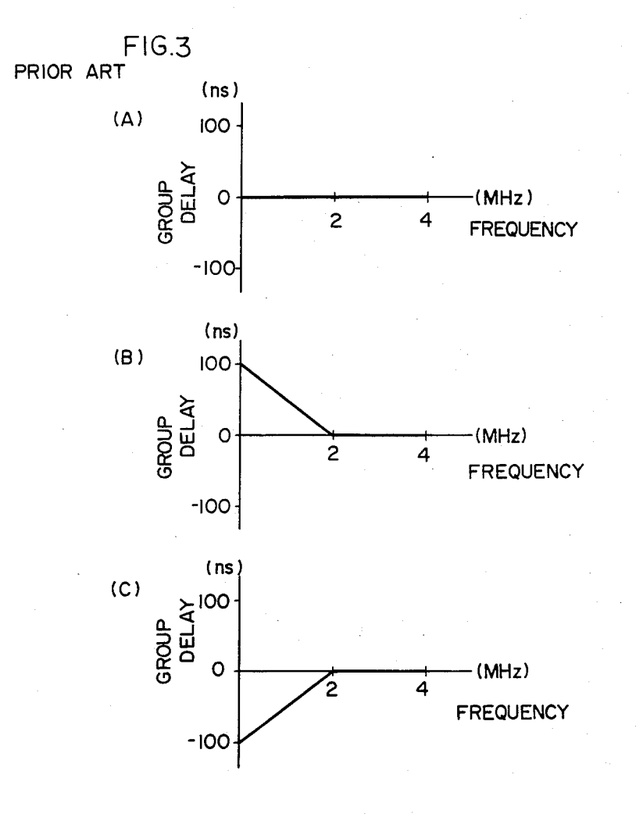
FIGS. 3(a)-3(c) are graphs showing an overall group delay characteristic of the transmission path between a transmitter end and a receiver end.

Meanwhile, the above described bit rate of the character multiplex signal is selected to be 5.73 Mbits/second in the case of the previously described C55 system of NHK, for example. Therefore, in the case of a repetition of the logics one and zero for each bit such as in the previously described clock run-in signal, the repetition frequency comes to correspond to a half of the bit rate, i.e. approximately 2.86 MHz. This means that the clock run-in signal is little influenced by the lower frequency range portion (0 to 2 MHz frequency range) of the group delay characteristic shown in FIG. 3.

On the other hand, the bit rate of the framing code signal in the character multiplex signal is also 5.73 Mbits/second as a matter of course. However, the framing code signal is not a signal of periodical repetition for each bit as described previously. This means that the framing code signal includes a frequency component relatively low, i.e. lower than 2 MHz. Accordingly, the framing code signal is influenced by the low frequency region group delay characteristic shown as (B) or (C) in FIG. 3, thereby to cause a waveform distortion and a phase distortion. Therefore, the framing code signal can not be properly sampled in the serial/parallel converting circuit 5 and the comparator 9 shown in FIG. 2 cannot detect coincidence of the predetermined code signal and the framing code signal and hence a problem is involved that an error is caused in achieving byte synchronization of the data signal.

More specifically, when a waveform distortion is caused in the framing code signal, the level of the distorted portion which was to be determined as the logic one decreases and that portion is determined as the logic zero in the slicer circuit 4 and hence is not sliced. Therefore, according to a conventional digital signal receiver, when the framing code signal is sampled in the serial/parallel converting circuit 8 as a function of the sampling clock signal, an error is caused in the first bit or the final bit out of three bits which must originally assume the high level consecutively at the beginning of the framing code signal, with the result that the framing code cannot be detected. Furthermore, when a phase distortion is caused in the framing code signal, the phase could be lagged or advanced. However, since the clock run-in signal is little influenced by the low frequency range group delay characteristic of the transmission path, no change occurs in the phase of the sampling clock signal being generated in synchronism with the clock run-in signal. This means that the phase of the framing code signal with respect to the sampling clock signal changes. More specifically, the sampling time of the framing code signal being sampled with the sampling clock signal deviates, with the result that an erroneous framing code signal is detected and a normal framing code signal is not detected. This causes an error not only in connection with the framing code signal but also in connection with the data when the succeeding data signal is sampled.

Therefore, it is necessary to improve a frequency characteristic centering on an overall group delay characteristic by correcting on the part of a receiver a characteristic of a transmission path up to the receiver. Since such group delay characteristic is different for each of the respective broadcasting stations and depending on a location for reception thereof, correction of such group delay characteristic becomes meaningless unless correction is made to a characteristic proper to each of them.

SUMMARY OF THE INVENTION

A principal object of the present invention is to provide a digital signal receiver adapted for improving on the part of a receiver a transmission frequency characteristic of a digital signal which is different for each of the respective broadcasting stations and a location for reception thereof, thereby to prevent a code error from occurring.

Briefly described, according to the present invention, a plurality of frequency characteristic correcting means are provided for correcting a group delay characteristic which is different for each of the respective broadcasting stations and a location for reception thereof, any one of the plurality of frequency characteristic correcting means being presettably selected in association with a selected station position of a station selecting means, and the corresponding frequency characteristic correcting means is selected by selecting means in response to a station selecting operation, for connection to the output of demodulating means.

Therefore, according to the present invention, an optimum frequency transmission characteristic can be preset and selected for each of the selected station position of the station selecting means and accordingly a transmission frequency characteristic can be corrected in accordance with each of the broadcasting stations and a location for reception thereof, with the result that a digital signal free from a code error and of a good quality can be reproduced.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 5 and 8 are schematic diagrams showing in detail embodiments of the present invention.

FIGS. 6 and 7 are preset switches used in the present invention.

DESCRIPTION OF THE PREFERRED EMBODIMENTS

Figure 4:
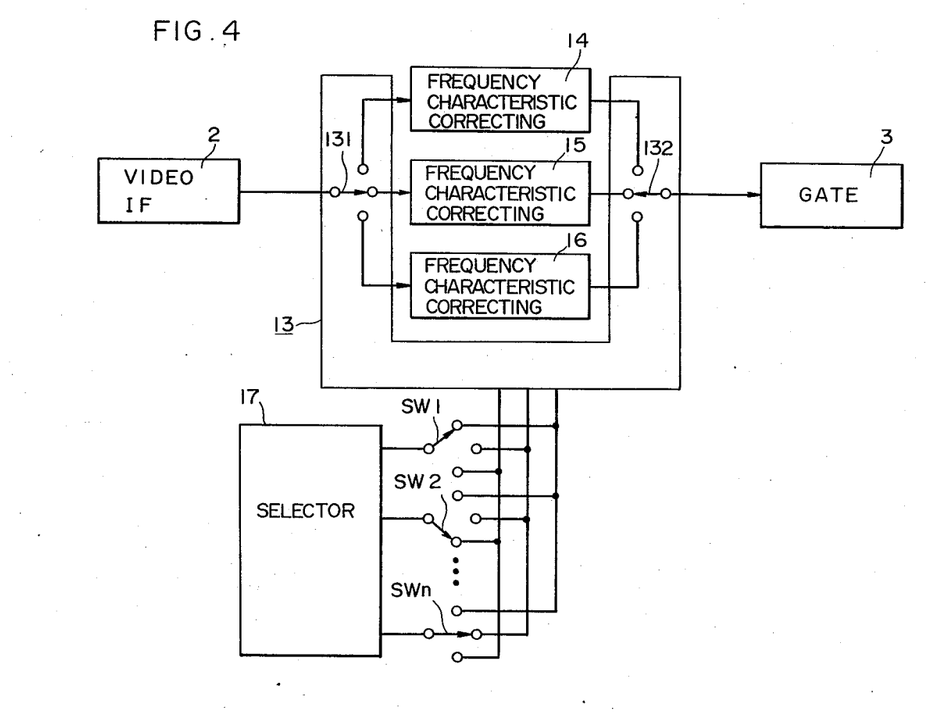
FIG. 4 is a block diagram of one embodiment of the present invention.

FIG. 4 is a block diagram of one embodiment of the present invention. First referring to FIG. 4, a structure of the embodiment will be described. A selecting means 13 and three frequency characteristic correcting circuits 14, 15 and 16 are provided between the video intermediate frequency circuit 2 and the gate circuit 3 shown in FIG. 2. The selecting means comprises selecting switches 131 and 132 which are operable in a ganged fashion with each other. The selecting switch 131 is provided for supplying a detected signal obtained from the video intermediate frequency circuit 2 to any of three frequency characteristic correcting circuits 14, 15 and 16. The selection switch 132 is provided for supplying the output from any one of the three frequency characteristic correcting circuits 14, 15 and 16 to the gate circuit 3. Each of the frequency characteristic correcting circuits 14, 15 and 16 has a correcting characteristic which is different from each other, wherein the first frequency characteristic correcting circuit 14 has no correcting function, i.e. the correcting characteristic is nil. More specifically, as described previously in conjunction with FIG. 3, if and when an overall group delay characteristic covering a transmitter end and a receiver end is flat as shown as (A) in FIG. 3, no correction is required, in which case the first frequency characteristic correcting circuit 14 is selected.

The second frequency characteristic correcting circuit 15 is adapted such that the same exhibits a characteristic reversed to that of (B) in FIG. 3, i.e. a characteristic symmetrical with respect to the abscissa (an advanced characteristic) while the third frequency characteristic correcting circuit 16 is adapted such that the same exhibits a characteristic reversed to that shown as (C) in FIG. 3 (a delay characteristic). Meanwhile, in designing the respective specific characteristics of the second and third frequency characteristic correcting circuits 15 and 16, preferably a low frequency region group delay characteristic of each character broadcasting channel is taken into account so that an average or typical characteristic of these may be selected.

The selecting station means 17 has a plurality of station selecting positions, each of which provides a switching signal upon selection of any of the broadcasting waves. The switching signal is supplied to the presetting means SW1, SW2, ... SWn. These presetting means SW1, SW2, ... SWn are provided for selecting or presetting any of the three frequency characteristic correcting circuits 14, 15 and 16 by means of the selecting means 13 for each of the respective station selecting positions. Accordingly, the selecting means 13 serves to select the corresponding frequency characteristic correcting circuit in association with the preset position of the presetting means SW1, SW2, ... SWn.

Figure 5:
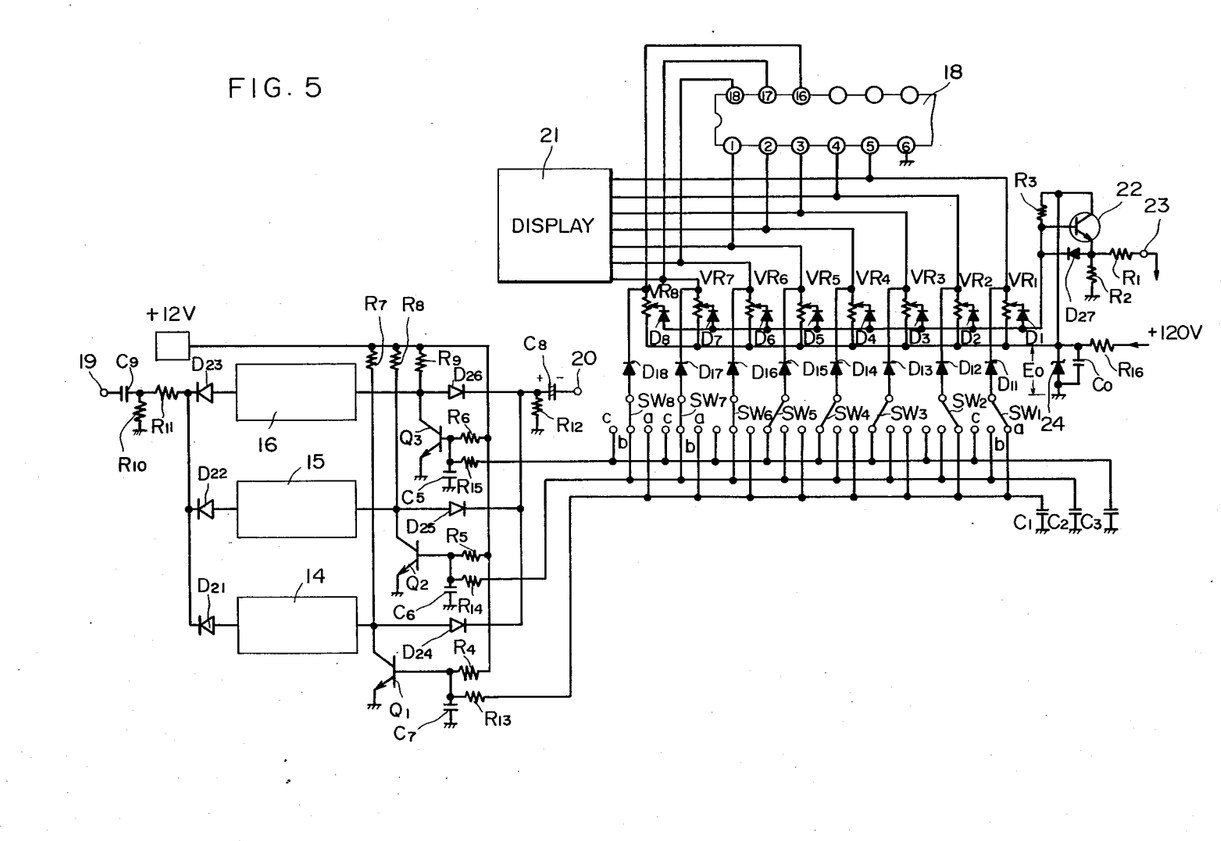

FIG. 5 is a schematic diagram of one embodiment of the present invention. Now referring to FIG. 5, the structure of the embodiment shown of the present invention will be described. A station selection integrated circuit 18 is adapted to provide a switching signal from any of pins Nos. 1 to 5 and Nos. 16 to 18 in response to operation of a channel selecting switch, not shown. Each switching signal is applied to a channel display 21 and one end of each of variable resistors VR1 to VR8 and is also applied to presetting switches SW1 to SW8 through reverse current preventing diodes D11 to D18. The variable resistors VR1 to VR8 are provided for presetting a tuning voltage at each of the tuning positions. The tuning voltage set by each of the variable resistors VR1 to VR8 is supplied to the base of a transistor 22 through the reverse current preventing diodes D1 to D8 and is also supplied to a tuner, not shown, through a reverse current preventing diode D27 and a resistor R1 from an output terminal 23. Meanwhile, the transistor 22 is provided for setting a variable range of the tuning voltage. The other end of each of the variable resistors VR1 to VR8 is supplied with a voltage V0 defined by a zener diode 24.

The presetting switches SW1 to SW8 are each provided for presetting selection of any one of the three frequency characteristic correcting circuits 14 to 16 at the respective tuning positions. To that end, the presetting switches SW1 to SW8 each comprise three contacts a, b and c. Each contact a is commonly connected through a resistor R13 to the base of a transistor Q1 and is also connected to the ground through a direct current blocking capacitor C1. Similarly, each contact b is also commonly connected through a resistor R14 to the base of a transistor Q2 and is also connected to the ground through a direct current blocking capacitor C2. Likewise, each contact c is commonly connected through a resistor R15 to the base of a transistor Q3 and is also connected to the ground through a direct current blocking capacitor C3. A biasing voltage is supplied through the resistors R4, R5 and R6 to the respective bases of the transistors Q1 to Q3. The respective bases of the transistors Q1 to Q3 are connected to the ground through the direct blocking capacitors C5, C6 and C7, respectively. The collectors of the transistors Q1, Q2 and Q3 are individually connected to the output terminals of the frequency characteristic correcting circuits 14, 15 and 16 and also connected through resistors R7, R8 and R9, respectively, to a direct current voltage source +12V. These transistors Q1, Q2 and Q3 constitute a selecting means for enabling any one of the three frequency characteristic correcting circuits 14, 15 and 16.

The anodes of the switching diodes D24, D25 and D26 are connected to the output terminals of the frequency characteristic correcting circuits 14, 15 and 16, respectively, while the cathodes thereof are commonly connected through a capacitor C8 to an output terminal 20 and is also connected to the ground through a resistor R12 forming a return path of a forward flowing current. The gate circuit 3 shown in FIG. 2 is connected to the output terminal 20.

The anodes of the switching diodes D21 to D23 are connected to the input terminals of the frequency characteristic correcting circuits 14 to 16, respectively, and the cathodes thereof are connected through the resistor R11 and the capacitor C9 to the input terminal 19. The output terminal of the intermediate frequency circuit 2 shown in FIG. 2 is connected to the input terminal 19. A resistor R10 is connected between the junction of the capacitor C9 and the resistor R11, and the ground. The resistors R10 and R11 form a return path of a forward flowing current of the switching diodes D21 to D23.

Now an operation will be described. When an operation for selecting the first position of the channel selecting switch is made, a switching signal of the low level is obtained from the pin No. 5 of the station selecting integrated circuit 18. A tuning voltage set by the variable resistor VR1 is obtained responsive to the switching signal through the reverse flow preventing diode D1 and the transistor 22 to the output terminal 23. The tuning voltage obtained from the output terminal 23 is applied to the tuner, whereby a desired broadcasting channel is received.

On the other hand, the reverse flow preventing diode D11 is also rendered conductive in response to the above described switching signal, whereby the base of the switching transistor Q1 is brought to an approximate ground level through the contact a of the preset switch SW1.

Therefore, the switching transistor Q1 is rendered non-conductive, whereby the collector potential increases. Accordingly, a current flows from the resistor R7 through the switching diode D24 and the resistor R12, whereby the switching diode D24 is rendered conductive. Since the frequency characteristic correcting circuit 14 has been coupled to the input and output thereof at that time, the switching diode D21 at the input end is also rendered conductive. Since the transistors Q1 and Q2 have been rendered conductive at that time, a reverse biasing voltage is applied to the switching diodes D22, D23, D25 and D26 so that the same are rendered non-conductive. Therefore, the frequency characteristic correcting circuits 15 and 16 have been disabled. Thus, only the first correcting circuit 14 is enabled, whereby the character multiplex signal supplied to the input terminal 19 undergoes correction by the frequency characteristic correcting circuit 14 and the signal, as corrected, is transferred to the output terminal 20.

Assuming that the preset switch SW1 is set to the second contact b in such first position selected state, the transistor Q2 is rendered non-conductive and the transistors Q1 and Q3 are rendered conductive, whereby the second frequency characteristic correcting circuit 15 is selected. If and when the preset switch SW1 is set to the third contact c, then the third frequency characteristic correcting circuit 16 is enabled.

As described in the foregoing, since any of the frequency characteristic correcting circuits 14 to 16 can be selected by presetting the presetting switches SW1 to SW8 for each of the positions of the station selecting apparatus, a group delay characteristic which is different for each of the broadcasting stations and a location for reception thereof can be properly corrected, with the result that a picture of a character multiplex broadcasting signal free from a code error and of a good quality can be reproduced.

Figure 6:
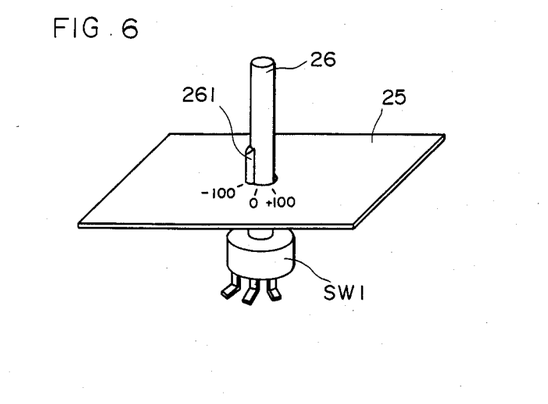
FIG. 6 is a perspective view of one example of the preset switch shown in FIG. 5.

FIG. 6 is a perspective view of one example of the preset switch shown in FIG. 5. A preset switch SW1 is mounted to an operation panel 25. The preset switch SW1 may comprise a rotary switch, for example, having a rotation knob 26 with a protrusion 261. The protrusion 261 is provided for pointing to a frequency characteristic correcting indication formed on the operation panel 25. Although not shown, other preset switches SW2 to SW8 are likewise mounted to the operation panel 25. Since the present switches SW1 to SW8 are thus provided on the operation panel 25, presetting can be readily made as to which of the frequency characteristic correcting circuits 14 to 16 shown in FIG. 5 is to be selected for each of the channels.

Figure 7:
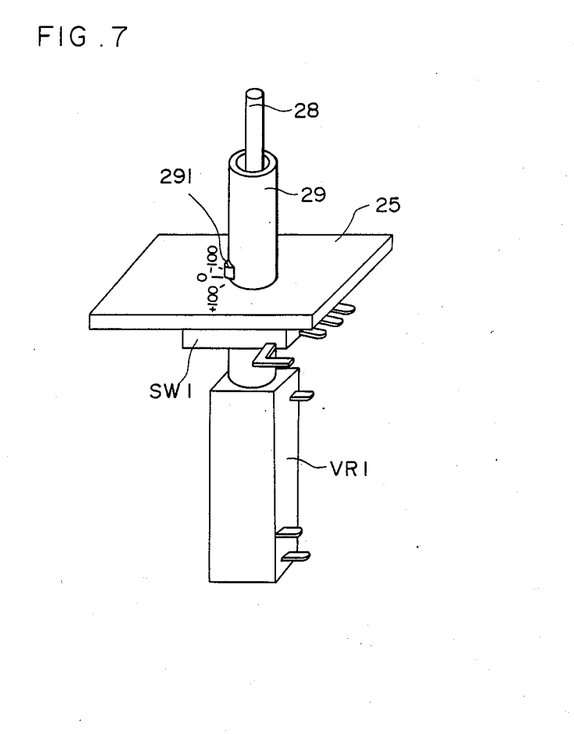
FIG. 7 is a perspective view showing another example of the preset switch shown in FIG. 5.

FIG. 7 is a perspective view showning another example of the preset switch shown in FIG. 5. The embodiment shown in FIG. 7 comprises a preset switch SW1 and a tuning voltage setting variable resistor VR1 coaxially arranged and mounted to an operation panel 25. More specifically, a tuning voltage setting knob 28 and a frequency characteristic correcting preset knob 29 are coaxially provided. The tuning voltage setting knob 28 is coupled to the tuning voltage setting variable resistor VR1 and the frequency characteristic correcting preset knob 29 is coupled to the preset switch SW1. The frequency characteristic correcting preset knob 29 is formed with a protrusion 291 for pointing to a frequency characteristic correcting indication, as is similar to FIG. 6. Although not shown, other preset switches SW2 to SW8 and other tuning voltage setting variable resistors VR2 to VR8 shown in FIG. 5 are also coaxially provided, respectively, and mounted to the operation panel 25.

As described in the foregoing, since the respective preset switches SW1 to SW8 and the tuning voltage setting variable resistors VR1 to VR8 are coaxially provided, presetting can be readily made as to which of the frequency characteristic correcting circuits is to be selected corresponding to a channel, in setting a tuning voltage for each of the respective channels, with the result that convenience of operation is enhanced.

Figure 8:
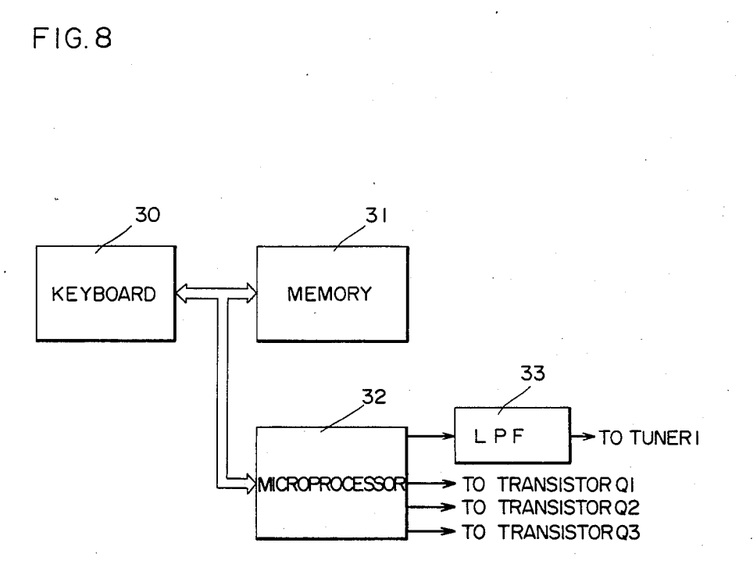
FIG. 8 is a block diagram of another embodiment of the present invention.

FIG. 8 is a block diagram of another embodiment of the present invention. The embodiment shown in FIG. 8 is adapted such that the preset data for indicating which of the frequency characteristic correcting circuits is to be selected is stored in a memory 31 in place of providing the preset switches SW1 to SW8 shown in FIG. 5. A keyboard 30 is provided for entry of a desired channel number. The channel number entered from the keyboard 30 is stored in the memory 31. The memory 31 stores a digital value representing the tuning voltage corresponding to the channel number and also stores in advance the preset data representing which of the frequency characteristic correcting circuits is to be selected corresponding to each of the channels. When a channel number is entered from the keyboard 30, a microprocessor 32 reads from the memory 31 the digital value representing the tuning voltage corresponding to the channel number, thereby to provide a pulse signal of a pulse width corresponding to the digital value. The pulse signal is supplied to the low-pass filter 33, whereby the same is converted to a direct current voltage for use as a tuning voltage. The direct current voltage is supplied to the tuner 1, whereby an electric wave broadcast from the corresponding broadcasting station is selected. The microprocessor 32 also reads the preset data corresponding to the channel number entered from the keyboard 30. Then the microprocessor 32 is responsive to the preset data to provide a low level signal, whereby any one of the transistors Q1 to Q3 shown in FIG. 5 is rendered non-conductive, so that the frequency characteristic correcting circuit corresponding to the transistor is enabled. The other operation is the same as that previously described in conjunction with FIG. 5. Such storage of the preset data in the memory 31 as described above eliminates necessity of providing the preset switches SW1 to SW8 having mechanical contacts as shown in FIG. 5, thereby to enhance reliability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital signal receiver for receiving a digital signal included in a transmitted broadcasting signal, comprising:
    channel selecting means for selecting transmitted broadcasting signal channels;
    demodulating means for demodulating a broadcasting signal of a channel selected by said channel selecting means and outputting an output signal including a digital signal;
    digital signal reproducing means for slicing and samping said output signal from said demodulating means and reproducing the digital signal;
    a plurality of frequency characteristics correcting means having different frequency characteristics for correcting the frequency characteristic of the total signal transmission path from a broadcasting transmitter to an output point of said demodulating means;
    selecting means operatively connected to said plurality of frequency characteristics correcting means for selectively switching one of said frequency characteristics correcting means into the signal path after said demodulating means; and
    preset means operatively connecting said selecting means to said channel selecting means so that one of said frequency characteristics correcting means corresponding to the channel selected by said channel selecting means is selected and connected into said signal path by said selecting means.

2. A digital signal receiver in accordance with claim 1, wherein
    said channel selecting means comprises switching signal providing means for providing a switching signal upon each selection of a given broadcast signal,
    said selecting means comprises switching means being provided for each of said plurality of frequency characteristic correcting means for disabling or enabling the corresponding frequency characteristic correcting means responsive to conduction or non-conduction thereof, respectively, of said switching means, and
    said preset means comprises respective contacts for supplying said switching signal from said switching signal providing means to any one of said switching means.

3. A digital signal receiver in accordance with claim 1, wherein
    said channel selecting means comprises entry means for entering data representing any of said plurality of selected channels,
    said preset means comprises
        storage means for storing preset data representing which of said plurality of frequency characteristic correcting means is to be selected,
    selected signal providing means responsive to the data entered from said entry means for reading corresponding preset data from said storage means for providing a selecting signal for selecting the frequency characteristic correcting means corresponding to said preset data, and
    said selecting means comprises switching means provided corresponding to each of said plurality of frequency characteristic correcting means and responsive to said selecting signal from said selecting means for enabling the corresponding frequency characteristic correcting means.

* * * * *

UNITED STATES PATENT AND TRADEMARK OFFICE
CERTIFICATE OF CORRECTION

PATENT NO. : 4,686,706

DATED : August 11, 1987

INVENTOR(S) : SAKAI

It is certified that error appears in the above-identified patent and that said Letters Patent is hereby corrected as shown below:

On the cover page, Item [73], "Morigushi" should read --Moriguchi--.

Signed and Sealed this

Fifth Day of April, 1988

Attest:

DONALD J. QUIGG

Attesting Officer

Commissioner of Patents and Trademarks